March 5, 1957     J. C. FONTAINE     2,783,802
NUTCRACKER
Filed March 4, 1954     4 Sheets-Sheet 1
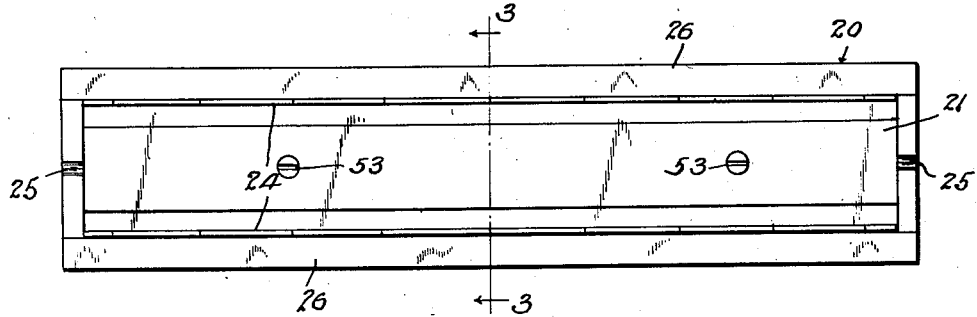
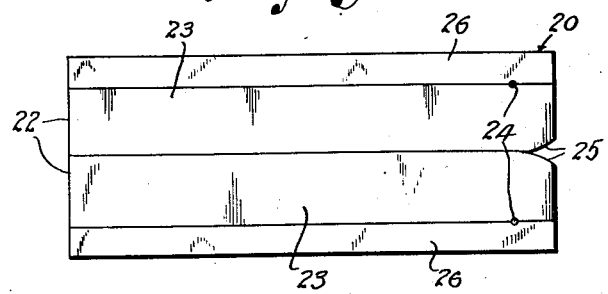
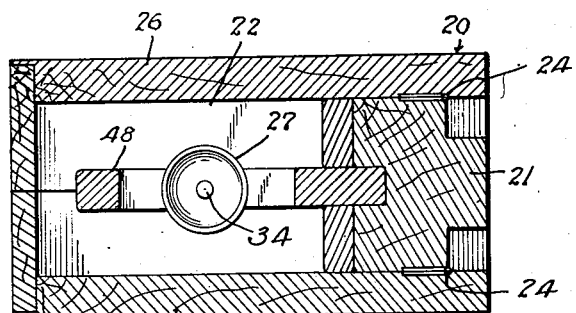
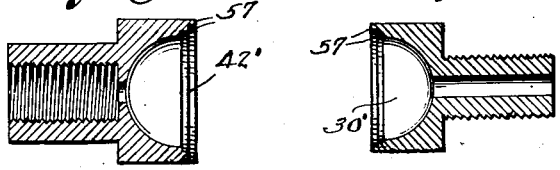
John C. Fontaine
INVENTOR
BY
ATTORNEYS.

March 5, 1957   J. C. FONTAINE   2,783,802
NUTCRACKER
Filed March 4, 1954   4 Sheets-Sheet 2
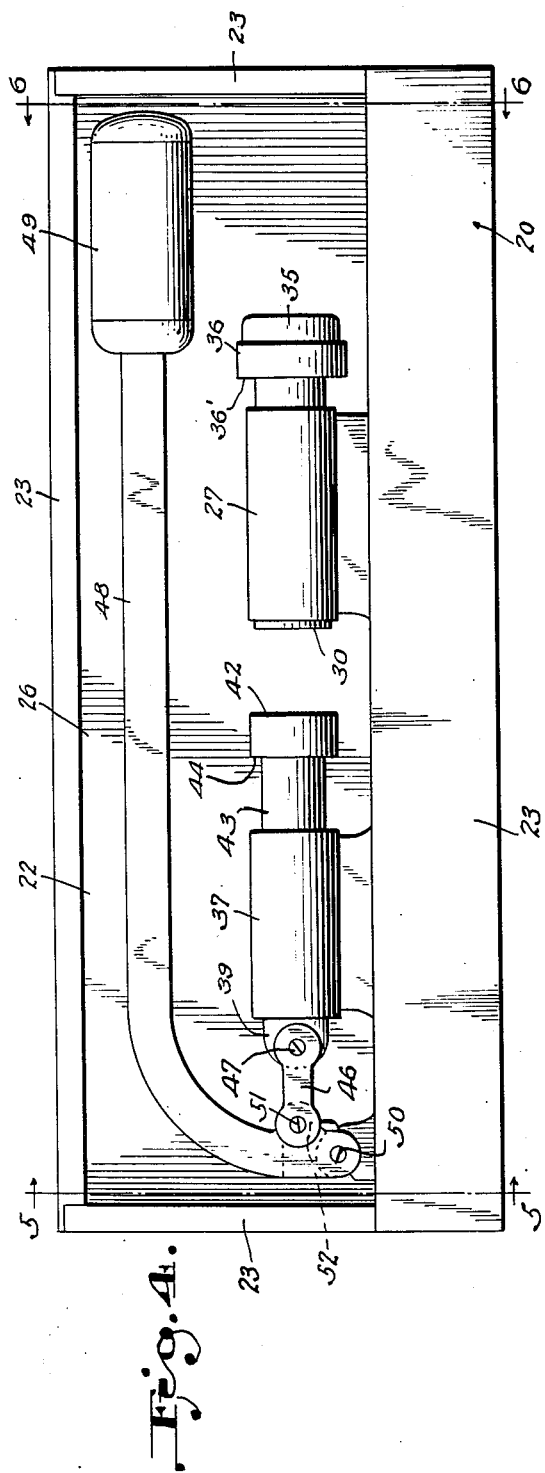
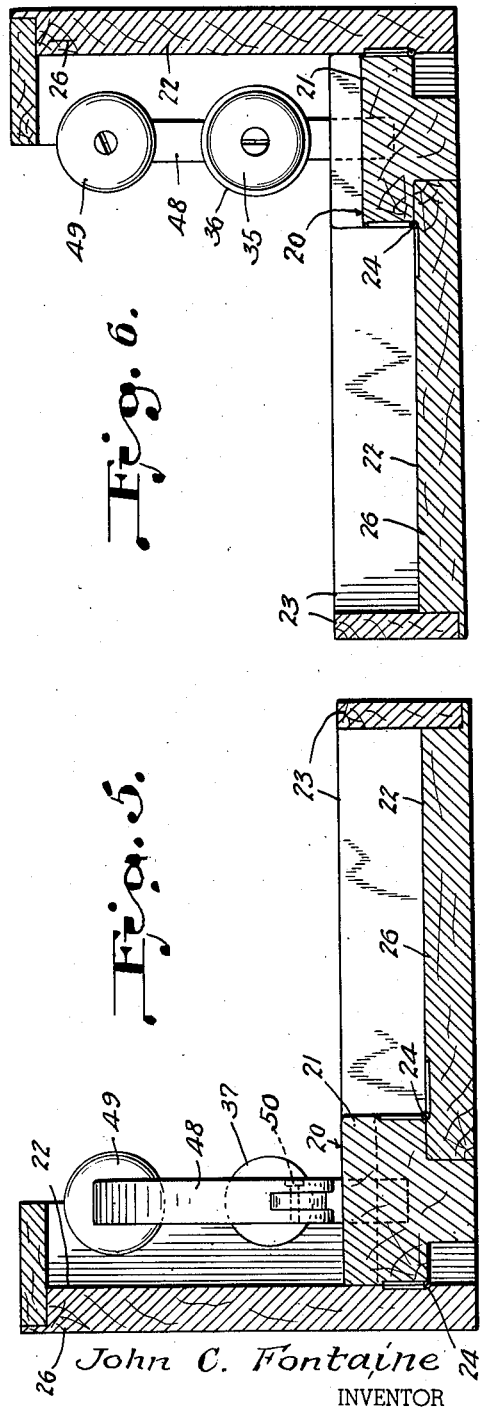
John C. Fontaine
INVENTOR
BY C. A. Knowles.
ATTORNEYS.

March 5, 1957  J. C. FONTAINE  2,783,802
NUTCRACKER
Filed March 4, 1954  4 Sheets-Sheet 3
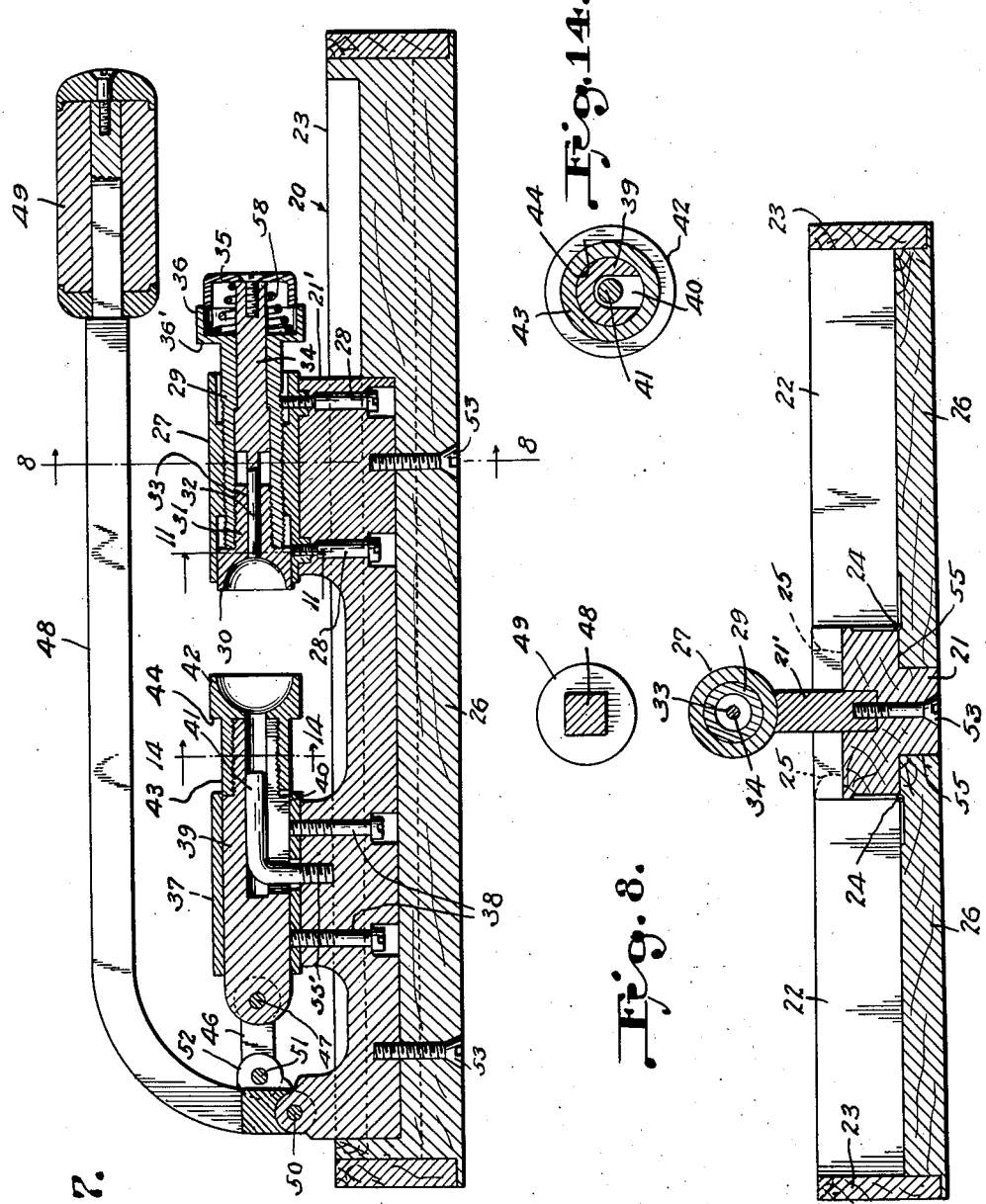
INVENTOR.
John C. Fontaine
BY
C.A.Snow&Co.
ATTORNEYS.

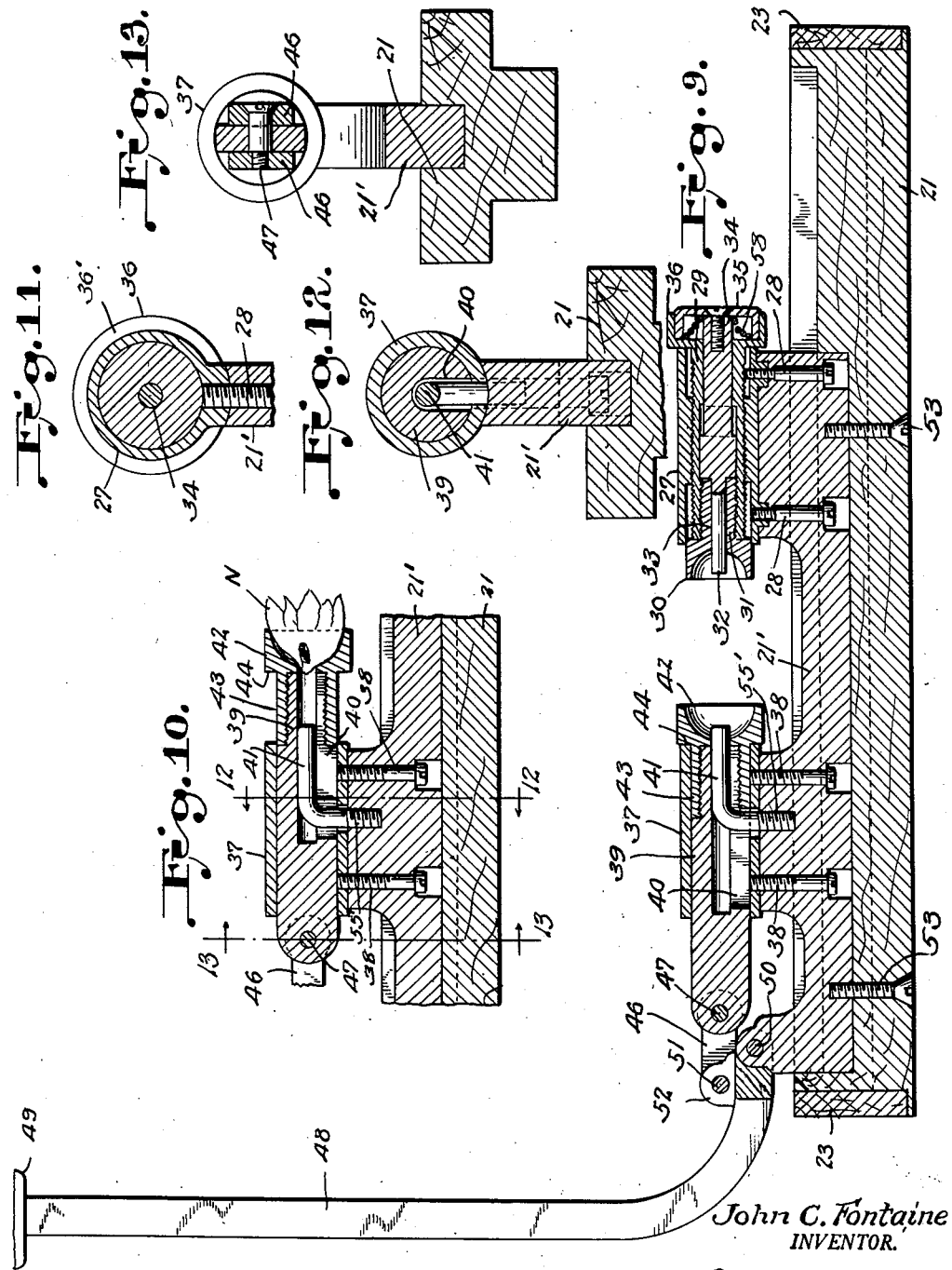

United States Patent Office 2,783,802
Patented Mar. 5, 1957

2,783,802

NUTCRACKER

John C. Fontaine, Shreveport, La.

Application March 4, 1954, Serial No. 414,210

5 Claims. (Cl. 146—14)

This invention relates to an improved nutcracker and more particularly to a manually actuated nutcracker having a pair of crushing cups for crushing and cracking the shell of a nut such as a pecan or the like, means being provided for removing portions of the shell of the nut cracked which may become wedged within the crushing cups, with each operation of the nutcracker, so that the crushing cups will be free of such obstruction when positioning the nuts within said cups.

Another object of the invention is to provide a tray embodying tray sections hingedly connected to opposite sides of a base, which provides the mounting for the nutcracker.

It is a further object of this invention to provide a nutcracker and cracked nut shell clearer of this kind which is relatively light in weight and easy to operate.

It is yet another object of this invention to provide a nutcracker of this kind which may be unfolded to an open position of its relative parts for proper operation and then folded, when so desired, for ready and proper storing of the device in its inoperative position.

Other and further objects and advantages of the invention will be hereinafter described and the novel features thereof defined in the appended claims.

In the drawings:

Figure 1 is a plan view of the bottom of my nutcracker in its folded position.

Fig. 2 is an end elevation of the nutcracker as folded enclosing the nutcracker.

Fig. 3 is a transverse section taken on line 3—3 of Fig. 1.

Fig. 4 is a side elevation of the partially unfolded nutcracker.

Fig. 5 is a transverse section taken on line 5—5 of Fig. 4.

Fig. 6 is a transverse section taken on line 6—6 of Fig. 4.

Fig. 7 is a longitudinal section of the unfolded nutcracker, taken through the longitudinal center thereof.

Fig. 8 is a transverse section taken on line 8—8 of Fig. 7.

Fig. 9 is a longitudinal section, partly broken away, taken through the longitudinal center of my unfolded nutcracker.

Fig. 10 is a transverse fragmental sectional view of the nutcracker, facing in a direction opposite to Fig. 14.

Fig. 11 is a transverse section, partly broken away, taken on the line 11—11 of Fig. 7.

Fig. 12 is a transverse section, partly broken away, taken on line 12—12 of Fig. 10.

Fig. 13 is a transverse section taken on line 13—13 of Fig. 10.

Fig. 14 is a transverse section taken on line 14—14 of Fig. 7.

Fig. 15 is a longitudinal section through a modified form of nutcracker cup removed from the assembly of my invention.

Fig. 16 is a longitudinal section of the cooperating cracker cup removed from the assembly of the nutcracker.

Referring more specifically to the drawings the numeral 20 designates generally a nutcracker constructed according to an embodiment of my invention.

The nutcracker 20 is provided with a center base 21 which is T-shaped in configuration, as better shown by Fig. 8, and has a longitudinal groove in the upper surface thereof in which the lower edge of the bar 21' is secured as by means of the screws 53. Collecting trays 22 including bottoms 26 are pivotally mounted on opposite sides of said base 21, the trays 22 extending longitudinally of the base 21, with the longitudinal hinged edges of said trays fitted within longitudinal cut out portions 55 of the center base 21 bracing the nutcracker when the trays are extended. Each of the trays 22 is provided with upwardly extending walls 23 about the periphery thereof, each of the trays having its inner longitudinal edge secured to the base 21 by a hinge 24 so that the trays may be either swung to a vertically extending position, as for storage of the nutcracker 20, or the trays may be extended outwardly from the base 21 for adequately supporting the nutcracker and at this time the trays 22 will be positioned for receiving the nuts before being cracked, or the shells after the nuts have been cracked.

When the trays 22 are folded to a position for enclosing the base 21 and nutcracker 20 they will be swung upwardly in enclosing relation to the nutcracker and actuating lever as clearly indicated in Figs. 1 and 2 of the drawings. The hinged edges of the tray sections are cut away at 25 to allow the trays to close around the nutcracker.

The nutcracker 20 is formed with a fixed cylinder 27 secured adjacent to one end of the bar 21' by bolts 28. A longitudinally extending sleeve 29 is threadably connected within the fixed cylinder 27, the fixed cylinder 27 being open at the opposite ends thereof for the purposes to be hereinafter more specifically described.

A nut cup 30 has a stem 31 which is threadably engaged within one end of the sleeve 29, said stem being externally threaded for engagement with the internally threaded end of the sleeve 29, as better shown by Fig. 7 of the drawings.

The stem 31 has a bore 33 therethrough which communicates with the nut cup 30 for slidably supporting the ejector pin 32 which is formed at the forward end of the shaft 34. A knob 35 is formed at the other end thereof for effecting manual movement of the shaft 34 and pin 32 to eject that part of the shell that may become wedged in the cup 30, the spring 58 returning the pin to its normal position. The knob 35 moves within a protecting cup 36 which is formed on one end of the sleeve 29, which cup 36 acts as a stop engaging one end of the cylinder 27 when assembling the nutcracker.

A second cylinder 37 is supported on the bar 21' adjacent to the opposite end thereof and spaced from the first mentioned cylinder 27 in horizontal alignment therewith, the cylinder 37 being secured to the bar 21' by bolts 38 which are extended through the bar 21' and engage in threaded openings in the outer wall of the second fixed cylinder 37.

A second sleeve 39 is slidably supported within the cylinder 37, the slidable sleeve 39 having a longitudinally extending groove 40 opening at one end thereof in the direction of the first fixed cylinder 27.

An inverted L-shaped ejector pin 41 is threadably engaged with the bar 21' at 55', the other end of the L-shaped ejector pin 41 extending parallel to and within the cylinder 37 and sliding sleeve 39 as clearly shown in Fig. 7 of the drawing.

A second nut cup 42 is threadably engaged with one end of the sliding sleeve 39, facing the fixed nut cup 30 described above, the nut cup 42 having a longitudinally extending hollow stem 43 which is interiorly threaded for threadable engagement with the outer surface of the sliding sleeve 39 also clearly shown in Fig. 7 of the drawings. The nut cup 42 is formed with a vertically or outwardly extending shoulder 44 adjacent to the nut receiving portion of the nut cup 42, the outwardly extending shoulder 44 being engageable with the adjacent end of the cylinder 37 providing a stop for limiting the movement of the slidable nut cup 42 in one direction.

A pair of spaced apart links 46 are pivotally connected to one end of the sleeve 39 by a pivot pin 47 so that the links 46 and the sliding sleeve 39 may be actuated by a manually operated lever 48 pivoted at 51 the lever having a handle 49 on one end thereof. Ear 52 is secured to the lever 48 and is spaced from the pivot pin 50 on which the lever is pivoted to the bar 21'. The links 46 also connect with the ear 52, so that swinging movement to operate the nutcracker will slide the sleeve 39 longitudinally of its supporting cylinder 37.

In the modified form of cups as shown by Figs. 15 and 16, the cups 30' and 42' are formed with recesses in the inner surfaces thereof providing spaced annular cutting edges 57 that contact the ends of different sized nuts, cutting off the ends of the shells of the nuts as the lever is operated, and at the same time cracking the main portions of the shells which fall away from the meat of the shells.

It will further be seen that due to the construction shown and described, the cups of the nutcracker may be adjusted with respect to each other to receive nuts of various sizes.

In the use and operation of the nutcracker 20 described above, a nut is initially positioned between the nutcracker cups in their separated positions with the lever 48 in a substantially erect position relative to the base 21. At this time the trays 22 are in a horizontal position relative to the base 21 so that the lever 48 is free for operation by the handle 49 which is actuated by a person using the nutcracker 20.

The initial pivoting movement of the lever 48 downwardly will effect the sliding of the nutcracker cup 42 in a direction towards the nut cracking cup 30 for crushing and breaking the shell of the nut held between cups 30 and 42. This position is clearly indicated in Fig. 7 of the drawings and at this time the ejector pin 41 is located within the groove 40.

When the nut shell has been cracked by the actuation of the slidable nut cup 42 and the sliding sleeve 39, the lever 48 is swung upwardly with the result that the sliding sleeve is moved rearwardly, over the ejector pin 41, the ejector pin protruding into the cup 42 ejecting any portion of the shell that may become wedged in the cup 42, clearing the cup for receiving another nut to be cracked.

The shaft 34 may be manually moved to project the ejector pin 32 through the cup 30 to remove any portion of the nut shell that may become wedged therein during the nut cracking operation.

At this time the nut shell will be discharged from the nut cups and will be free for moving, by gravity, downwardly and outwardly into the trays 22 clearly described above and shown in the drawings.

While the specific details of one embodiment of this invention have been herein shown and described, the invention is not confined thereto as changes and alterations may be made without departing from the spirit and scope thereof as defined in the appended claims.

I claim:

1. A nutcracker of the kind described comprising a rectangular base member, dished trays hingedly mounted on the opposite sides of said base member, a fixed nut shell crushing cup fixed on one end of said base, a movable nut crushing cup slidable longitudinally relative to said base, a manually actuated lever pivoted adjacent the other end of said base and connected to said movable cup for crushing a nut shell between said movable cup and said fixed cup upon movement of said lever in one direction, a nut shell ejecting pin fixed adjacent said lever end of said base, and extending through said manually actuated slidable cup for ejecting cracked shells from said movable cup upon movement of said lever in the opposite direction, a normally inactive manually operated second nut ejecting pin slidable in said fixed cup for ejecting crushed nut shells from the fixed nut shell crushing cup, and a knob on one end of said last mentioned ejecting pin for effecting movement thereof.

2. A nutcracker as defined in claim 1 wherein said trays are movable to a position enclosing said cups and said lever.

3. An improved nutcracker of the kind described comprising an elongated rectangular base, a hollow open ended cylinder fixed adjacent one end of said base, an open ended sleeve threaded in said cylinder, a nut engaging cup threaded on one end of said sleeve, said sleeve being open at the opposite end, a second open ended cylinder fixed on said base adjacent the other end thereof, a second sleeve open at one end thereof slidable in said second cylinder, a second nut engaging cup threaded on one end of said second sleeve and opening in the direction towards the first mentioned cup for crushing a nut between said cups, said second sleeve having a longitudinally extending slot therethrough opening at the open end of said second sleeve, a longitudinally extending arm on the other end of said second sleeve, a lever pivoted at one end thereof on said base remote from said fixed cylinder and pivoted intermediate the ends thereof on the other end of said arm for moving said second mentioned cup towards said first mentioned cup thereby crushing and cracking a nut shell between said cups, an inverted L-shaped nut shell ejecting pin fixed at one end thereof to said base and the other end of said pin extending through the slot of said second sleeve, said other end of said ejecting pin extending longitudinally within said second sleeve and through said second cup for ejecting cracked nut shell from said latter cup upon rocking said lever for movement of said cups apart, a second nut shell ejecting pin slidable in said first mentioned sleeve and extending at one end thereof through said first mentioned cup and a knob on the other end of said second mentioned pin.

4. An improved nutcracker as defined in claim 3 including trays pivotally connected to opposite sides of said base for receiving the crushed shells in the outwardly extending position of said trays, each tray partially enclosing said nutcracker and lever in the upwardly extending closed position relative to said base.

5. A nutcracker comprising a base, a fixed cylinder mounted at one end of said base, a fixed nutcracker cup secured within said cylinder, said cup having an opening formed therein, a shell ejector pin having a knob on one end thereof, movable through said opening of said cup to eject a nut shell therefrom, a coiled spring disposed between said knob and one end of said fixed cylinder normally urging said shell ejector pin to its retracted position within said cylinder out of alignment beyond the inner surface of said fixed cup, said knob providing means for manually effecting movement of said shell ejector pin, and a movable nutcracker cup mounted on said base for operating with said fixed cup in cracking the shell of a nut held between said cups.

References Cited in the file of this patent
UNITED STATES PATENTS

| | | |
|---|---|---|
| 537,477 | North | Apr. 16, 1895 |
| 2,085,262 | La Ferney | June 29, 1937 |